United States Patent
Kelkar et al.

(10) Patent No.: US 6,654,764 B2
(45) Date of Patent: Nov. 25, 2003

(54) SYSTEMS, METHODS, AND COMPUTER PROGRAM PRODUCTS TO INTERPRET, EXPLAIN, AND MANIPULATE EXCEPTIONS IN MULTIDIMENSIONAL DATA

(75) Inventors: Bhooshan Prafulla Kelkar, Fremont, CA (US); William Earl Malloy, Santa Clara, CA (US)

(73) Assignee: International Business Machines Corporation, Armonk, NY (US)

(*) Notice: Subject to any disclaimer, the term of this patent is extended or adjusted under 35 U.S.C. 154(b) by 69 days.

(21) Appl. No.: 09/998,955

(22) Filed: Nov. 15, 2001

(65) Prior Publication Data

US 2003/0101202 A1 May 29, 2003

(51) Int. Cl.⁷ .............................................. G06F 17/30
(52) U.S. Cl. ..................................................... 707/102
(58) Field of Search ........................... 707/1–200, 201; 702/65

(56) References Cited

U.S. PATENT DOCUMENTS

| | | | |
|---|---|---|---|
| 5,890,151 A | 3/1999 | Agrawal et al. | 707/5 |
| 5,905,985 A | 5/1999 | Malloy et al. | 707/100 |
| 5,926,818 A | 7/1999 | Malloy | 707/100 |
| 5,926,820 A | 7/1999 | Agrawal et al. | 707/200 |
| 5,940,818 A | 8/1999 | Malloy et al. | 707/2 |
| 5,943,668 A | 8/1999 | Malloy et al. | 707/3 |
| 5,978,788 A * | 11/1999 | Castelli et al. | 707/2 |
| 6,094,651 A | 7/2000 | Agrawal et al. | 707/5 |
| 6,108,647 A * | 8/2000 | Poosala et al. | 707/1 |
| 6,122,636 A | 9/2000 | Malloy et al. | 707/102 |
| 6,205,447 B1 | 3/2001 | Malloy | 707/102 |
| 6,438,537 B1 * | 8/2002 | Netz et al. | 707/3 |
| 6,456,949 B1 * | 9/2002 | Yamagajo et al. | 702/65 |
| 2002/0198919 A1 | 12/2002 | Kelkar | 709/100 |
| 2003/0014417 A1 | 1/2003 | Kelkar | 707/100 |

OTHER PUBLICATIONS

Pairceir, Ronan et al. (ACM publication, "Discovery of Multi–Level Rules and Exceptions form a Distributed Database", pp. 523–532, Aug. 2000).*

Chaudhuri, Surajit et al. (ACM publication, "An Overview of Data Warehousing and OLAP Technology", pp. 1–10, no date).*

Kelkar, B., *Exploiting Symbiosis between Datamining and OLAP Business Insights.* DM Direct, Dec. 21, 2001, http://www.dmreview.com/editorial/dmdirect_/dmdirect article.cfm=EdID=4446&issue=122101&record=3.

Doron Rotem, et al., *Extendible Arrays for Statistical Databases and OLAP Applications,* Proceedings of 8$^{th}$ Intl Conf on Scientific and Statistical Database Systems, Jun. 18–20, 1996, pp. 108–117. (ISBN 0–8186–7264–1).

Jayavel Shanmugasundaram et al., *Compressed Data Cubes for OLAP Aggregate Query Approximation on Continuous Dimensions,* ACM 1999 1–58113–7/99/08.

J. Han, et al., *Efficient Computation of Iceberg Cubes with Complex Measures,* Proceedings of the 2001 ACM SIGMOD Intl Conf. on Management of Data, May 21–24, 2001, Santa Barbara, CA. vol. 30, No. 2, Jun. 2001. pp 1–12.

(List continued on next page.)

*Primary Examiner*—Diane D. Mizrahi
(74) *Attorney, Agent, or Firm*—Christine H. Smith

(57) ABSTRACT

Systems, methods, and computer products that interpret, explain, and manipulate exceptions in multidimensional data. The present invention assists the data analyst by providing a simplified view of the multidimensional data that enables analysis of the important results of data exception exploration. Further, the preferred embodiment of the present invention incorporates the effect of density of the data along each dimension. The preferred embodiment of the present invention also provides the framework necessary to assign linguistic meaning to the exception for each dimension. This enables data analysis to obtain information about the value of the data that is present.

22 Claims, 5 Drawing Sheets

OTHER PUBLICATIONS

Sam Sung et al., *Smoothing over Summary Information in Data Cubes,* Journal of Systems Integration, vol. 10, No. 1, Nov. 2000, pp. 5–22.

Dimitri Theodratos, et al. *Answering Multidimensional Queries on Cubes Using Other Cubes,* Proc. of 12$^{th}$ Intl Conf. on Scientific and Statistical Database Management Jul. 26–28, 2000, Berlin, Germany, IEEE Computer Society pp 110–122.

Sunita Sarawagi, *Explaining Differences in Multidimensional Aggregates,* Proceedings of 25$^{th}$ Intl. Conf. on Very Large Data Bases, Edinburgh, Sept. 7–10, 1999, pp 42–53.

Sunita Sarawagi, et al. *Discovery–Driven Exploration of OLAP Data Cubes,* Advances in Database Technology, EDBT 1998, 6$^{th}$ Intl Conf on Extending Database Technology, Valencia, Spain, Mar. 23–27, 1998, Proceedings vol. 1377 pp. 168–182.

Chang Li et al, *A Data Model for Supporting on–line Analytical Processing,* Proceedings of 5$^{th}$ Intl Conf. on Information and Knowledge Management, Nov. 12–16, 1996, Rockville, MD, USA, pp. 81–88.

Agrawal, et al, US Patent Application #09/500,263, filed Feb. 8, 2000, *System and Method for Explaining Exceptions in Data,* Assignee–International Business Machines Corporation, ARC919990078US1.

\* cited by examiner

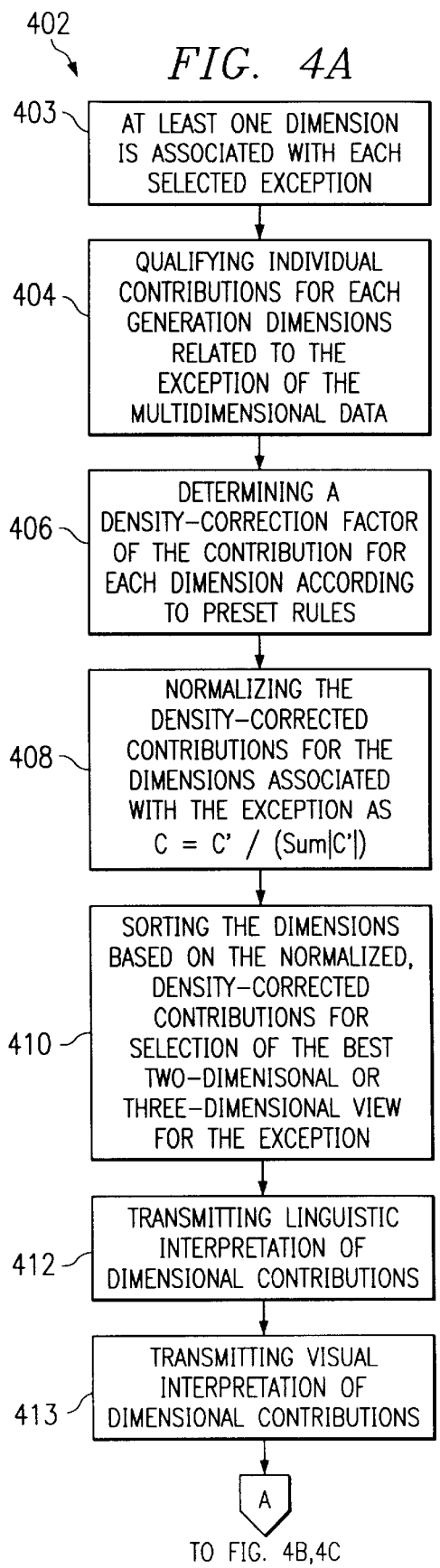
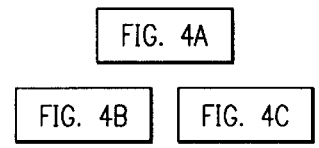
FIG. 4
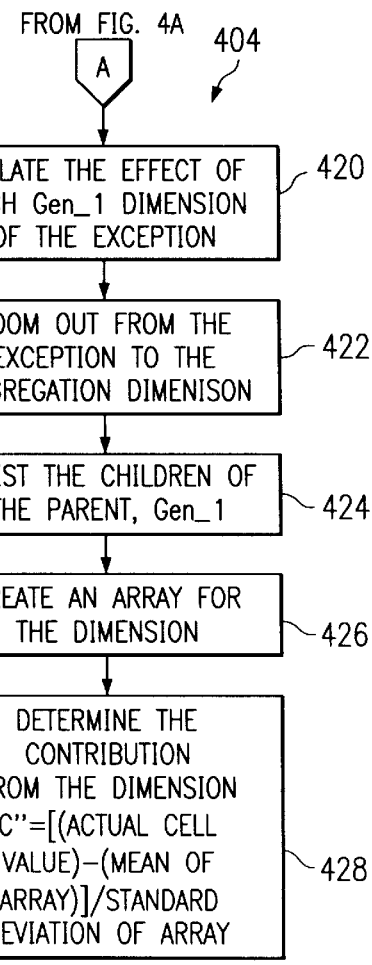
FIG. 4B

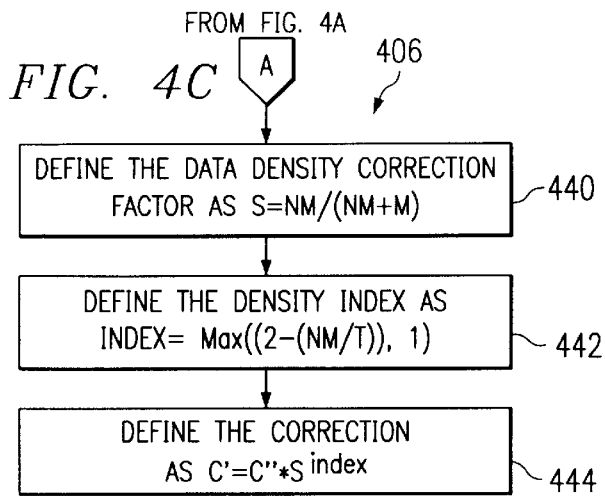
FIG. 4C
FIG. 5
FIG. 5A
FIG. 5B
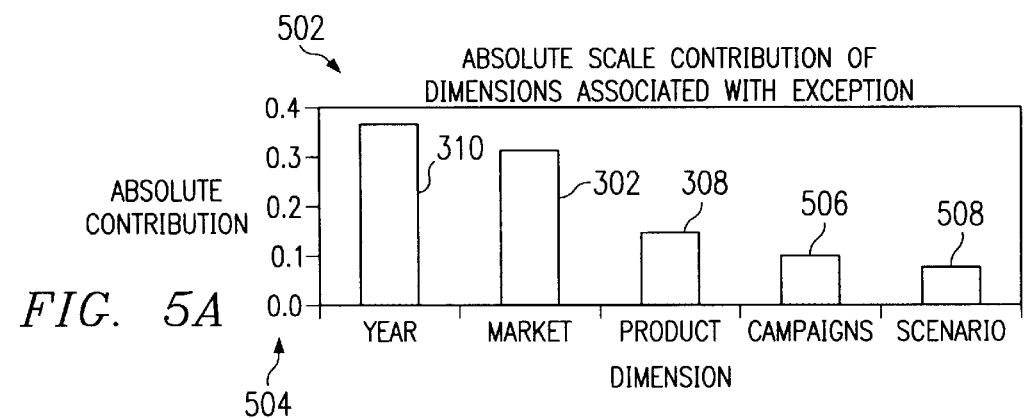
FIG. 5A
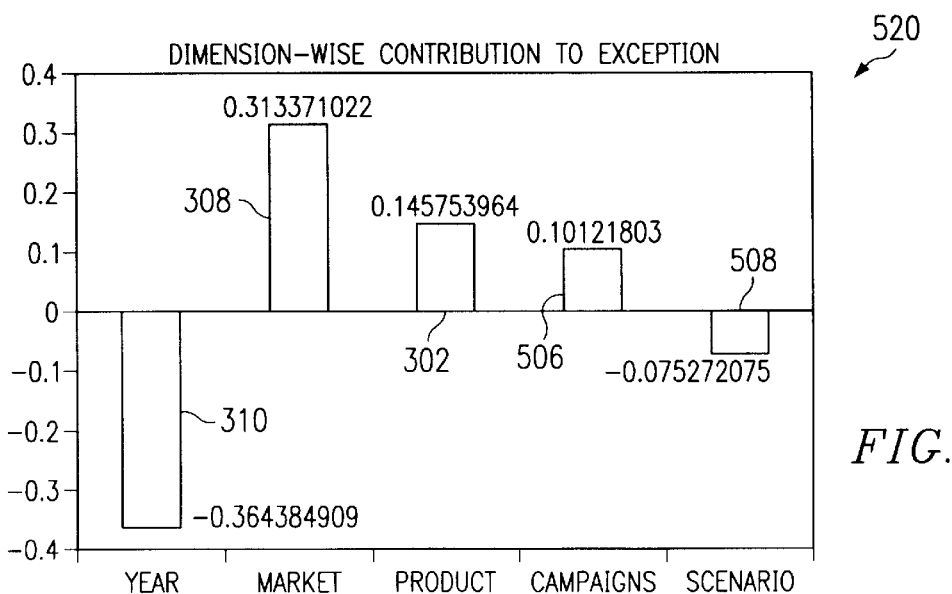
FIG. 5B

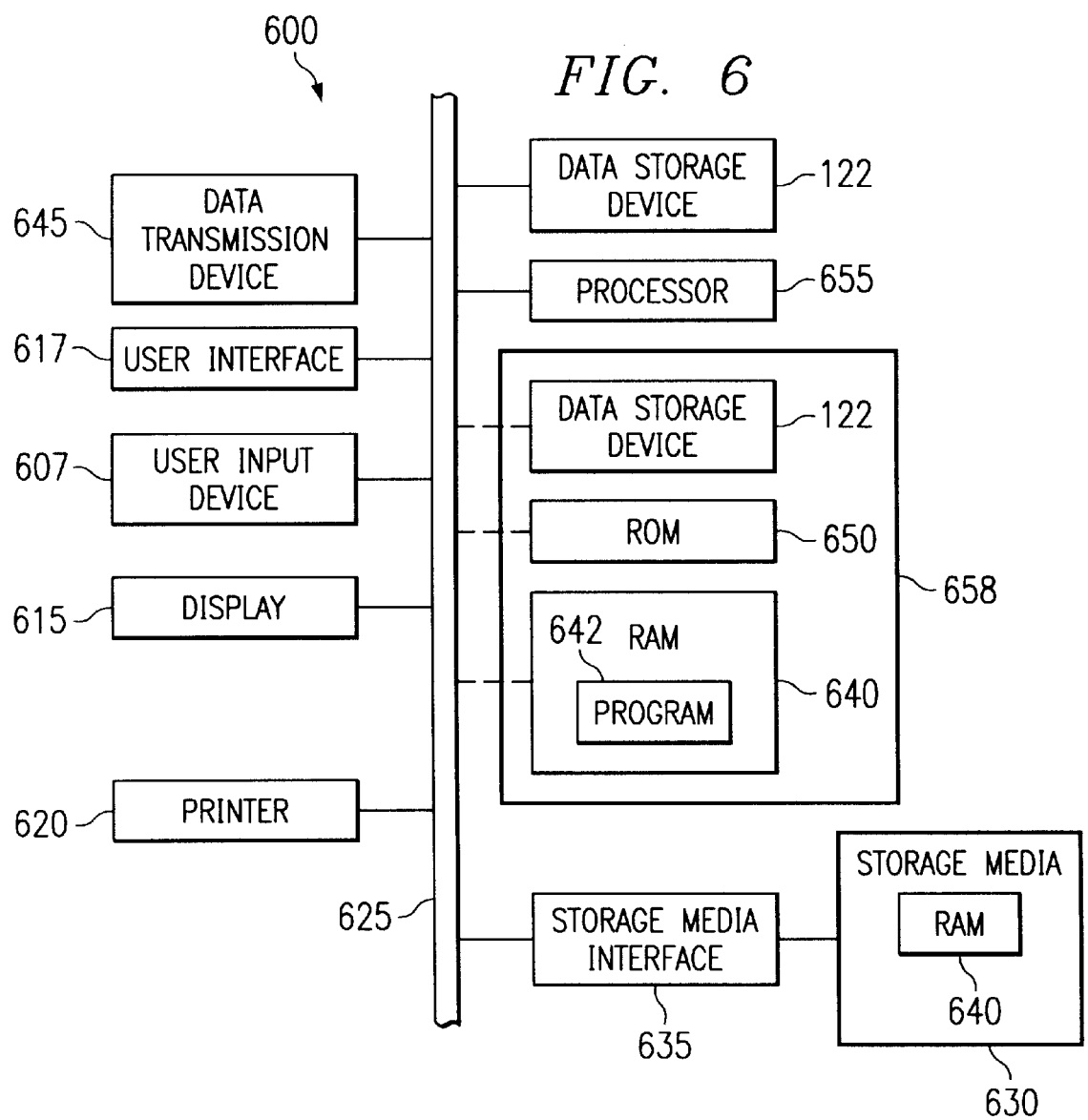

SYSTEMS, METHODS, AND COMPUTER PROGRAM PRODUCTS TO INTERPRET, EXPLAIN, AND MANIPULATE EXCEPTIONS IN MULTIDIMENSIONAL DATA

BACKGROUND OF THE INVENTION

1. Field of the Invention

The present invention is directed to the field of computer-based multidimensional data modeling. It is more particularly directed to interpreting, explaining, and manipulating exceptions in multidimensional data on a computer system.

2. Description of the Background Art

On-Line Analytical Processing (OLAP) is a computing technique for summarizing, consolidating, viewing, analyzing, applying formulae to, and synthesizing data according to multiple dimensions. OLAP software enables users, such as analysts, managers and executives, to gain insight into performance of an enterprise through rapid access to a wide variety of data "views" or "dimensions" that are organized to reflect the multidimensional nature of the enterprise performance data. An increasingly popular data model for OLAP applications is the multidimensional database (MDDB), which is also known as the "data cube." OLAP data cubes are often used by a data analyst for interactive exploration of performance data for finding regions of anomalies in the data, which are also referred to as "exceptions" or "deviations." Problem areas and new opportunities associated with the enterprise are often identified when an anomaly in the enterprise data is located.

An exception represents the degree of surprise associated with data that is included in an OLAP data cube. An exception may be defined by means of an example. Given a two-dimensional data cube having "p" values along a first dimension "A," and "q" values along a second dimension "B," the element or quantity corresponding to the ith value of dimension A and jth value of dimension B is denoted as, "$y_{ij}$." To estimate the exception, $y_{ij}$, in this data cube, an expected value, "$\hat{y}_{ij}$," of $y_{ij}$ is calculated as a function, "f()," of three terms: (1) a term "$\mu$" that denotes a trend that is common to all y values of the cube, (2) a term "$\alpha_i$" that denotes special trends along the ith row with respect to the rest of the cube, and (3) a term "$\beta_j$" that denotes special trends along the jth column with respect to the rest of the cube. The residual difference "$r_{ij}$" between the expected value $\hat{y}_{ij}=f(\mu,\alpha_i,\beta_j)$ and the actual value $y_{ij}$ represents the relative importance of the exception, $y_{ij}$, based on its position in the cube.

By means of further explanation, when a data cube has three dimensions, for example, with dimension, "C," being the third dimension, the expected value $\hat{y}_{ijk}$ is calculated by taking into account not only the kth value of the third dimension, but also the three values corresponding to the pairs (i,j) in the AB plane, (i,k) in the AC plane and (j,k) in the BC plane. The expected value $\hat{y}_{ijk}$ is then expressed as a function of seven terms as:

$$\hat{y}_{ijk}=f(\mu,\alpha_i,\beta_j,\gamma_k,(\alpha\beta)_{ij},(\alpha\gamma)_{ik},(\gamma\beta)_{kj}), \qquad (1)$$

where $(\alpha\beta)_{ij}$ denotes the contribution of the ijth value in the AB plane, $(\alpha\gamma)_{ik}$ denotes the contribution of jkth value in the AC plane, and $(\gamma\beta)_{kj}$ denotes the contribution of the kjth value in the BC plane. In general, for any k-dimensional cube, the y value can be expressed as the sum of the coefficients corresponding to each of the $2^k-1$ levels of aggregations or group-bys of the cube. The "coefficient" represents a component that provides information used in making predictions about the expected value of $\hat{y}$ and a "group-by" represents different combinations of the dimensions associated with the multidimensional cube. In the present example, group-bys include "AB" and "ABC." Therefore, a coefficient is a group-by component that contributes to predictability of a cell in a multidimensional cube. The coefficient model may be used to make predictions about the expected value of an exception.

By means of example, a three-dimensional cube will be considered. The function, f() can take several forms or models, such as an additive form, where function f() is a simple addition of all its arguments, and a multiplicative form, where function f() is a product of its arguments. It will be appreciated by those skilled in the art that the multiplicative form can be transformed to the additive form by performing a logarithm on the original data values. For a multiplicative model, the $y_{ijk}$ values denote the log of the original y-values of the cube. The log is used to remove bias associated with the distribution. That is, taking the log will tend to normalize the distribution. The choice of the best form of the function depends on the particular class of data, and is preferably selected by a user having understanding and experience with the data at hand. For example, the distribution of the data is one of the factors that may be used to determine the best form of the function.

The final form of Equation One as shown in Equation Two is, $$y_{ijk}=\hat{y}_{ijk}+r_{ijk}=\mu+\alpha_i+\beta_j+\gamma_k+(\alpha\beta)_{ij}+(\alpha\gamma)_{ik}+(\gamma\beta)_{kj}, \qquad (2)$$

where $r_{ijk}$ is the residual difference between the expected value $\hat{y}_{ijk}$ and the actual value $y_{ijk}$. The relative importance of an exception is based on the value of its residual. That is, the higher the value of the residual, the higher the importance of the exception.

There are several ways of deriving values of the coefficients of Equation Two. One way of deriving coefficients is shown in U.S. Pat. No. 6,094,651. The approach is a mean-based solution where the coefficients are estimated by taking the logs of all the relevant numbers and then the mean of the previous result. Taking the log will distribute the numbers so that the effect of large differences in the values of the cells is reduced. When the mean is derived a trend may be observed. In general, the coefficient corresponding to any group-by, "G," is recursively determined, according to the mean-based solution, by subtracting the coefficients from group-bys that are at a smaller level of detail than, G, from the average y value at G.

The mean-based approach for calculating the coefficients is not particularly robust in the presence of extremely large numbers that are outliers. An "outlier" represents data that is related to a coefficient that deviates from the trend of the data by a significant amount. There are statistical methods for deciding when to keep or discard these suspected outlier data points. A number of well-known alternative approaches for handling large outliers can be used, such as the Median Polish Method and the Square Combining Method, disclosed by D. Hoaglin et al., *Exploring Data Tables, Trends and Shapes*, Wiley Series in Probability, 1988, and incorporated by reference herein. These two alternative approaches are based on using a "median" instead of "mean" for calculating the coefficients. Nevertheless, these alternative approaches have an associated high computational cost. Consequently, the mean-based approach is preferred for most OLAP data sets because significantly large outliers are uncommon in most data sets.

The method for determining a residual, "$r_{ijk}$," may be determined from Equation Two as shown in Equation Three.

$$r_{ijk}=|y_{ijk}-\hat{y}_{ijk}| \quad (3)$$

The greater the value of $r_{ijk}$, the more likely that the cell in the multidimensional data for which an expected value is being calculated is an exception in the data model. However, the residual value may need to be standardized for a meaningful comparison of multidimensional data. A "standardized residual value" is calculated as shown in Equation Four.

$$sr=|y_{ijk}-\hat{y}_{ijk}|/\sigma_{ijk} \quad (4)$$

The step of standardization is performed because the magnitude of the residual may appear to be significantly larger than the other values considered. Considering the magnitude of the residual alone can be misleading because the residual should be evaluated in relation to the data in the neighboring cells. Normalization of the data is achieved by applying a standard deviation ($\sigma_{ijk}$) to the process. It will be appreciated by those skilled in the art that there are many methods of calculating a standard deviation associated with data in the multidimensional cube. The standardized residual can then be used to rank the exceptions that are found. The higher the value of the standardized residual, the higher is the rank. The first exception in a decreasingly sorted array of exceptions will have the highest value of the standardized residual. A residual approach however is limited since the user views actual data and not the residual details, therefore the interpretation and explanation of an exception is not always obvious to the user.

The process of determining and analyzing a multidimensional cube exception is quantitative, while the analyst would like to use a qualitative approach. The information that is viewed in a quantitative approach, such as the coefficient approach, can be overwhelming. This happens because the number of possible two-dimensional or three-dimensional views that spawn three or two dimensions from the OLAP multidimensional sub-cube increases steeply. The number of possible three-dimensional views for N dimensions are (N)*(N−1)*(N−2)/6 and two-dimensional views are (N)*(N−1)/2. For example, if we have a cube with 7 dimensions, then the number of views for the end-user to analyze, "C," are C=(7*6)/2=21 for two-dimensional views, and C=(7*6*5)/6=35 for three-dimensional views. In the absence of any formal way to focus on a few dimensions, the analyst has to view all thirty-five or twenty-one views to identify the best view for an exception, which makes it difficult to interpret and explain an exception.

There is a solution described in U.S. Pat. No. 6,094,651 that addresses exceptions and uses the concept of maximal terms. In general, a coefficient approach is limited since large coefficients are typically associated with smaller dimensional terms and the explanations are often too broad, spanning more data than necessary. This method looks at two-dimensional or three-dimensional views. However, the views are used for analysis rather than to examine individual dimensions. This limits the amount of data that is used to determine trends in the data.

Missing values are not considered in current exception-related solutions. For example, in a dimension in which a portion of the cells have no value the coefficient approach or the residual approach may generate information that indicates a more significant exception than actually exists.

Another limitation in the current solutions is that a framework for assigning linguistic labels to an exception is not often provided. The information is presented in a quantitative manner instead of a qualitative manner. This limits data analysts from obtaining information about the value of the data that is presented.

From the foregoing it will be apparent that there is still a need to improve the interpretation, explanation, and manipulation of exceptions in multidimensional data on a computer system.

SUMMARY OF THE INVENTION

An embodiment of the present invention relates to systems, methods, and computer products that interpret, explain, and manipulate exceptions in multidimensional data on a computer system. The present invention is related to the field of computer-based multidimensional data modeling often used by data analysts. The present invention assists the data analyst by providing a simplified view of the multidimensional data that enables analysis of the important results of data exception exploration.

The preferred embodiment of the present invention operates with an exception-enhancing module and enables determination and analysis of an exception in a multidimensional cube by a qualitative approach. The overwhelming amount of information that may be viewed in a quantitative approach is reduced to the important information, according to the present invention. More particularly, the preferred embodiment of the present invention enables interpretation and explanation of selected exceptions in multidimensional data.

Further, the preferred embodiment of the present invention incorporates the effect of density of the data along each dimension. That is, in a dimension in which a portion of the cells have no value the preferred embodiment of the present invention re-evaluates the relative importance of an exception to ensure that the density of the data is considered. In the preferred embodiment of the present invention, the user may set a threshold value that indicates the acceptable data density in a data cube.

The preferred embodiment of the present invention also provides the framework necessary to assign linguistic meaning to relative exceptions associated with each dimension. This enables data analysts to obtain information about the value of the data that is presented.

An embodiment of the present invention is achieved by systems, methods, and computer products that interpret and explain exceptions that are selected from multidimensional data. The method comprises (a) associating at least one dimension with each selected exception, (b) qualifying individual contributions for each dimension related to the exception of the multidimensional data, (c) assigning a density threshold preset rule to each dimension; (d) determining a density correction factor of the contribution, (e) determining a density-corrected contribution based on the density correction factor and the density threshold preset rule; (f) normalizing the density-corrected contributions for the dimensions associated with the exception, and (g) sorting the dimensions based on the normalized, density-corrected contributions for selection of the best two-dimensional or three-dimensional view for the exception. Qualification of individual contributions includes considering the influence of generations associated with the dimension. That is, generations associated with a dimension typically represent specific information that is related to the top-level dimensional category.

Further, the sorted data may be visually represented, such as by a histogram or a pie chart. An alternate embodiment of the present invention generates a framework for assigning linguistic meaning to the contributions from the relevant dimensions.

Other aspects and advantages of the present invention will become apparent from the following detailed description, taken in conjunction with the accompanying drawings, illustrating by way of example the principles of the invention.

BRIEF DESCRIPTION OF THE DRAWINGS

In the following detailed description and in the several figures of the drawings, like elements are identified with like reference numerals.

FIG. 4A is a flow diagram that illustrates the method of present invention;

FIG. 4B is a flow diagram that illustrates the method of qualifying individual contributions;

FIG. 4C is a flow diagram that illustrates the method of determining a density correction factor;

FIG. 5A is a block diagram that illustrates an example of dimension-wise contributions on an absolute scale;

FIG. 5B is a block diagram that illustrates an example of dimension-wise contributions to exceptions; and FIG. 6 is a block diagram of a computer system suitably configured for employment of the present invention.

DESCRIPTION OF THE INVENTION

Figure 1:
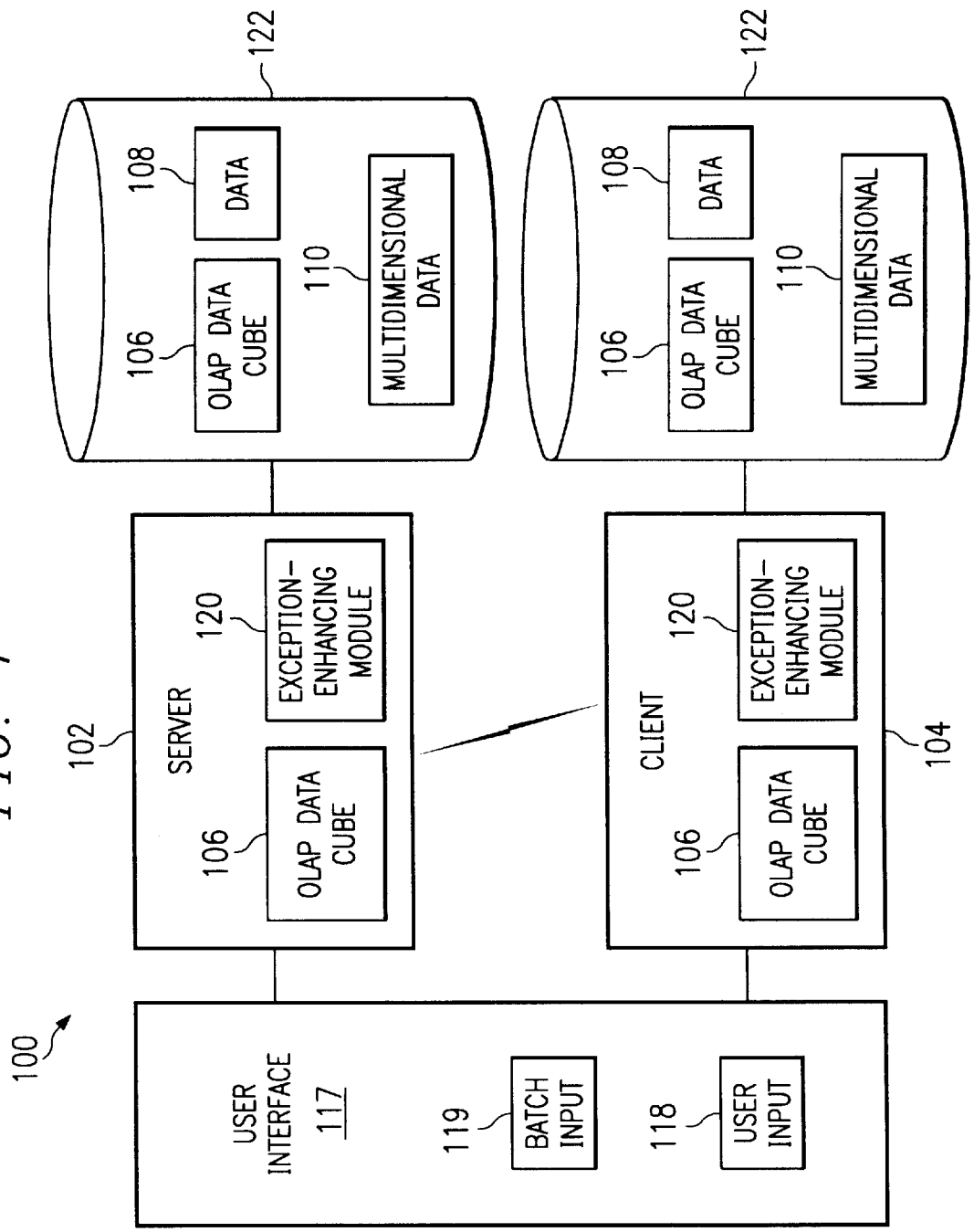
FIG. 1 is a block diagram that illustrates the present invention.

As shown in the drawings and for purposes of illustration, the preferred embodiment of the invention novelly interprets, explains, and manipulates exceptions in multidimensional data on a computer system. Further, the preferred embodiment of the present invention selects relevant dimensions from the multidimensional data and advantageously provides numerical and qualitative interpretation of the multidimensional data, considers data density explicitly in the interpretation of the multidimensional data, provides easy visualization of the interpretation of the multidimensional data, and provides a framework for assigning linguistic meaning to the relevant dimensions. Existing systems have not been able to efficiently and adequately interpret and explain exceptions from selected multidimensional data and to assign linguistic meaning to selected relevant dimensions.

The preferred embodiment of the present invention advantageously analyzes the contribution from each dimension with respect to an exception. Therefore, the value of the entire multidimensional data is considered when weighing the relative importance of an exception. The present invention assists the data analyst by providing a simplified view of the multidimensional data that enables analysis of the important results of data exception exploration.

The preferred embodiment of the present invention advantageously reduces the amount of effort required to find the best view of an exception by isolating the important two-dimensional and three-dimensional views of an exception from the large number of possible combinations of two-dimensional or three-dimensional views for an exception.

The preferred embodiment of the present invention advantageously explicitly incorporates density of data and data distribution in the factors used to determine the best view for an exception. Further, the user may indicate a threshold value of the acceptable data density in a data cube.

Yet another advantage of the preferred embodiment of the present invention is that it enables the creation of a framework for the assignment of linguistic labels associated with the results obtained from analyzing dimension-wise contributions for an exception. This enables the production of more precise simple statements about the exception under analysis.

As shown in FIG. 1 and in element 100, the preferred embodiment of the present invention may operate in a client-server computer system configuration. Therefore, a client computer system 104 may communicate with a server computer system 102 during the operation of the present invention. The exception-enhancing module 120 operates in either the client 104 or the server 102 to perform the preferred embodiment of the present invention. For example, information may be communicated to either the server 102 or the client 104 via the user interface 117. Through such communication threshold information may be established and may subsequently be used by the exception-enhancing module 120 to manipulate data 108, such as multidimensional data 110, according to the operation of the present invention. The user interface 117 may communicate with the preferred embodiment of the present invention, either via batch input 119 or user input 118.

Further, an OLAP data cube 106 may be configured in the memory 658 of either the client 104 or the server 102. Alternatively, the OLAP data cube 106 may be configured in computer storage such as that of a disk 122. Typically, the OLAP data cube 106 is configured in computer storage of a disk 122 associated with a client 104. The terms "OLAP data cube" and "data cube" will be used interchangeable herein. Element 658 is described with reference to FIG. 6.

Figure 2:
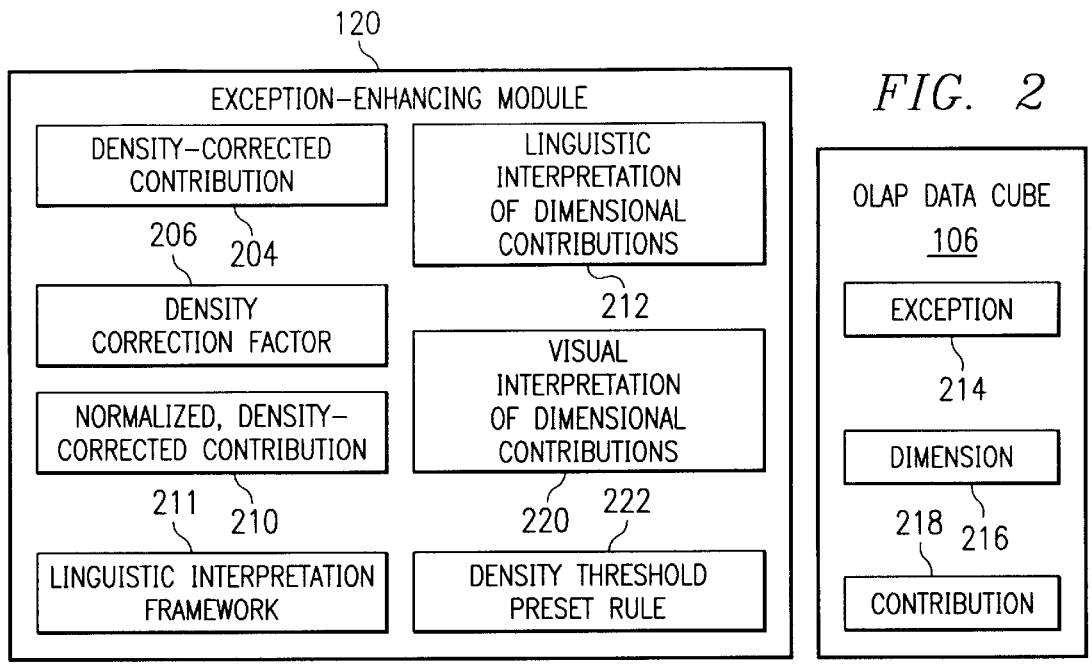
FIG. 2 is a block diagram that illustrates the exception-enhancing module and the OLAP data cube.

As shown in FIG. 2, the OLAP data cube 106 includes the following elements: the exception 214, the dimension 216, and the contribution 218. The dimension 216, may be represented as a row or column in an OLAP data cube 106 and is organized to reflect the multidimensional nature of the enterprise performance data 108. The exception-enhancing module 120 interprets contributions 218 that are qualified for each dimension 216. The exception 214 represents regions of anomalies in the multidimensional data 110 and at least one dimension 216 is associated with each selected exception 214.

The exception-enhancing module 120 includes elements used in the preferred embodiment of the present invention. The exception-enhancing module 120 is typically program code that may be embodied as a computer program 642 (as shown in FIG. 6). The density correction factor 206 represents the density associated with the data cube 106 and is used in the preferred embodiment of the present invention to determine the density-corrected contribution 218. The density-corrected contribution 204 is created by the preferred embodiment of the present invention and advantageously factors information about the density of the multidimensional data 110 into the contribution 218. The density-corrected contribution 204 is determined based on the density correction factor 206 and the density threshold preset rule 222. The exception-enhancing module 120 also includes a density threshold preset rule 222 that is set by the user and is used to define an acceptable density level for the multidimensional data 110. The density threshold preset rule 222 is assigned to each dimension 216. The density threshold preset rule 222 may be defined by user input 118. The normalized density-corrected contribution 210 represents a value that is normalized to smooth out any outliers associated with a contribution 218, thereby more accurately reflecting the importance of the contributions 218 that are associated with the dimension 216. The sorted dimensions 216 provide information so that the data analyst may chose the best view of the dimensions 216 associated with a selected exception 214. Elements 106, 108, 110, and 118 are described with reference to FIG. 1.

Figure 3:
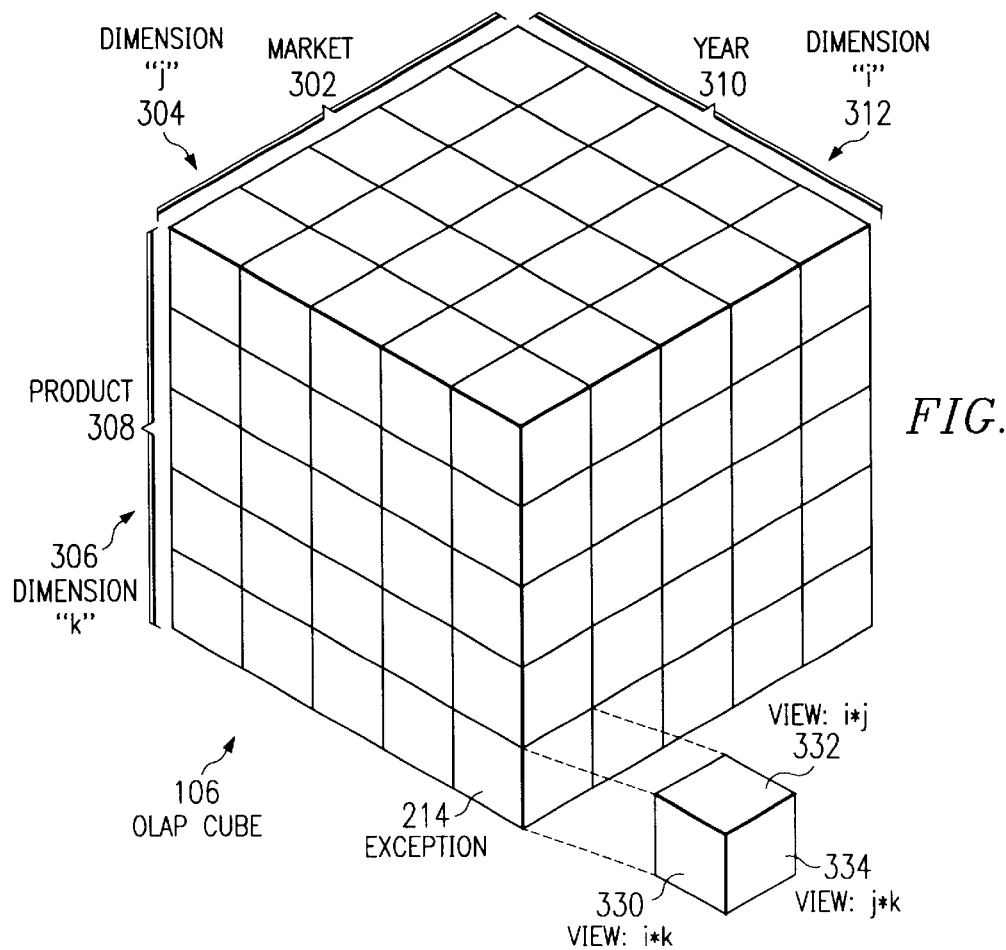
FIG. 3 is a block diagram of an OLAP data cube that is suitably configured for operation with the present invention.

The exception-enhancing module 120 includes a linguistic interpretation of dimensional contributions, as shown in element 212. A linguistic interpretation framework 211 is used by the preferred embodiment of the present invention to determine the linguistic interpretation 212. The linguistic interpretation 212 is used to describe relationships among the important sorted dimensions 216 associated with the multidimensional data 110 to the data analyst. Therefore, sorted dimensions 216 may be represented by a linguistic interpretation 216 via the linguistic interpretation framework 211. The exception-enhancing module 120 also includes a visual interpretation of dimensional contributions, as shown in element 220, that visually represents the dimensions 216 associated with normalized density-corrected contributions 210. As shown in FIG. 3, an OLAP data cube 106 is suitably configured for operation with the present invention. Therefore, by means of explanation, an example of the operation of the present invention is described. The dimension 216 is herein represented by dimension "i" 312, dimension "j" 304, and dimension "k" 306. Further dimension "j" herein represents market data 302, dimension "k" 306 herein represents product data 308, and dimension "i" 312 herein represents year data 310. An example in the multidimensional cube 106 of an exception 214 is a three-dimensional cell. Further, the three-dimensional cell may be shown to have dimensions 216 or views. Here, there are three views: view "i*j" 332, view "j*k" 334, and view "i*k" 330.

FIG. 4A and element 402 illustrate the preferred method of the present invention. Initially, as shown in element 403, at least one dimension 216 is associated with each selected exception 214. That is, at least one dimension 216 is identified. An identified dimension 216 may be generational, or non-generational if no generational structure dimension 216 is associated with a first generation dimension 216. The user may define an exception 214 that may include any combination of dimensions 216. Elements 214 and 216 are described with reference to FIG. 2.

Then, the individual contributions 218 for each generational dimension 216 that are related to the exception 214 of the multidimensional data 110 are qualified, as shown in element 404. Each dimension 216 may have a different generational structure with respect to other dimensions 216 in a multidimensional cube 106. For example, the dimension "Market" represents the first generation of the dimension "Market. The dimension "Market" may include states, such as California and Oregon, that represent the second generation of the dimension "Market." Areas within each state, such as San Francisco and Sacramento, represent the third generation of the dimension "Market." Element 404 is described in detail with respect to FIG. 4B. Elements 106 and 110 are described with reference to FIG. 1, and element 218 is described with reference to FIG. 2. As shown in element 406, density threshold preset rules 222 are used to determine the density correction factor 206 of the contribution 218 for each dimension 216. The method of operation of the preferred embodiment of the present invention is shown in detail in FIG. 4C and element 406. Elements 206 and 222 are described with reference to FIG. 2.

As shown in element 408, the density-corrected contributions 204 for the dimensions 216 associated with the exception 214 are normalized. More particularly, as shown in Equation Five, the density-corrected contributions 204 are normalized as follows.

$$C_\delta = C'_\delta / \Sigma |C'_\delta| \qquad (5)$$

It will be appreciated that values associated with the exception may be negative and the normalized density-corrected contributions represent the magnitude of the values. Therefore the summation of the contribution factor, "$C'_\delta$," is translated into its absolute value during normalization to eliminate the effect of negative numbers. C' is described in detail with respect to Equation Ten. Element 204 is described with reference to FIG. 2.

Then, as shown in element 410, dimensions 216 are sorted based on the normalized, density-corrected contributions 210, "$C_\delta$." The sorted dimensions therefore enable selection of the best two-dimensional or three-dimensional views for the exception 218. Then, as shown in element 412, the linguistic interpretation of dimension-wise contributions 212 may be transmitted. Also as shown in element 413, the visual interpretation of the dimension-wise contributions 220 may be transmitted. For example, the visual interpretation 220 may be displayed as a histogram or a pie chart. Elements 210, 212, and 220 are described with reference to FIG. 2.

FIG. 4B and element 404 illustrate in detail the operation of qualifying contributions 218 for each generation of dimensions 216. First, the effect of each generational dimension, "Gen_1," of the exception 214 is isolated, as shown in element 420. Those skilled in the art will appreciate use of the term, "Gen_1." For an OLAP data cube 106 with, "D," dimensions [1 ... δ ... D] let each of the δ dimensions have $m_\delta$ members [1 ... $k_\delta$ ... $m_\delta$]. Let ψ be the exception 214 at the intersection of D dimensions as $\psi_{1,2,\ldots,D}$. By means of example, D equals three if there are three dimensions, such as "i," "j," and "k." If "i" has five members then, $m_i$ equals five. Each dimension could be associated with a different number of members. For instance, if dimension "i" represents time, then "m" is equal to twelve if each month is represented. If dimension "j" represents the states in the Unites States, then "j" may equal fifty.

As shown in element 422, to isolate the effect of the Gen_1 dimension "δ," we zoom out from the exception 214 to the aggregate generational information about the dimension 216. That is, at least one dimension 216 is associated with a selected exception 214. As shown in element 424 and in the process of zooming out, the second generational dimensions 216 of this parent dimension 216, Gen_1, for $\psi_{1\ldots\delta\ldots D}$ are enlisted. Therefore, as shown in element 426, an array, "$A^\delta$" for dimension δ is created, as is shown in Equation Six. The array, $A^\delta$, includes variables, represented by the notation "$Xn^{kn}$," where Xn represents a position with respect to the dimension 216 and kn represents a particular member associated with the dimension 216. For example, if the position along a dimension, Xn, is "Market" and the member, kn, is "California," then the value of $Xn^{kn}$ in this case is "Market.California."

$$A^\delta = \{[X_1^{k_1}, X_2^{k_2}, 1, X_D^{kD}], [X_1^{k_1}, X_2^{k_2}, 2, X_D^{kD}] \ldots x' \ldots [X_1^{k_1}, X_2^{k_2}, \delta, X_D^{kD}]\} \qquad (6)$$

As shown in element 428, the contribution 218 from dimension δ is determined. That is, the contribution 218, "$C''_\delta$," is defined, as shown in Equation Seven.

$$C''_\delta = \{x' - \mu_\delta\}/\sigma_\delta \tag{7}$$

More particularly, $\mu_\delta$ is the mean value of the array, "$A^\delta$," and "$\sigma_\delta$," is the standard deviation of the array, "$A^\delta$." By means of further explanation, "x'" represents the value in a cell of an OLAP data cube 106. A "cell" represents the intersection of two or more dimensions 216.

FIG. 4C describes element 406 in detail. As shown in FIG. 4C and element 440, the data density correction factor 206 is defined by examining the elements in the array, "$A^\delta$." By means of explanation, "M," represents the elements in the array "$A^\delta$" that have no value and "NM," represents the elements in the array "$A^\delta$" that have a value. The density correction factor 206 is defined as shown in Equation Eight.

$$S_\delta = NM/(NM+M) \tag{8}$$

By means of further explanation, given a predefined density threshold value 222, such as, "T," the relative importance of the contributions from that dimension 216 may be ascertained. Therefore, if there is an insignificant number of "NM" elements there is a lack of certainty that the distribution for the contribution 218 from that dimension 216 is normal. The threshold value "T," that is the density threshold preset rule 222, could be provided via a user interface 117 and may be specific to an OLAP data cube or to the type of dimension 216, such as sales or service data 108. The threshold value, "T," should be a statistically significant number. If the number of members associated with a dimension 216 is very small, a provision may be made to ignore the analysis associated with the dimension 216. The element 222 is described with reference to FIG. 2.

Those skilled in the art will appreciate OLAP multidimensional data 110 is sometimes very sparse. Very sparse multidimensional data 110 is often more sparse with respect to each successive generational dimension 216. When the multidimensional data 110 is very sparse it becomes quite difficult to identify an exception 214, since there are few trends that are associated with sparse multidimensional data 110 from which to ascertain exceptions 218.

Now the density index is defined, as shown in element 442 and in Equation Nine.

$$\text{index} = \max\{[2 - (NM/T)], 1\} \tag{9}$$

By means of example, given an array, "$A^\delta$," that has "NM," elements that are equal to two times "T," and the total elements, "NM+M," are equal to five times "T," then the data density index is forty percent. In other words, the array is 60 percent unpopulated and therefore the contribution determined from the "M," values of the array, "$A^\delta$," may not be reliable. For example, if the same array, "$A^\delta$," had been completely populated, then different trends may have been observed. Therefore, conclusions drawn on the basis of sparse multidimensional data 110 may be misleading. It will be appreciated that other operations may be employed to account for the density of the data cube 106 without departing from the spirit of the present invention.

The correction factor is defined as shown in element 444 and in Equation Ten.

$$C'_\delta = C''_\delta * S_\delta^{\text{index}} \tag{10}$$

By means of example, FIG. 5A and element 502 illustrate absolute scale contributions 218 to exceptions 214. In the present example, the exception 214 relates to a five-dimensional analysis for sales data 108. The five dimensions intersecting at this exception 214 include: "Market," as shown in element 302, "Year," as shown in element 310, "Product," as shown in element 308, "Campaigns," as shown in element 506, and "Scenario," as shown in element 508. For the purposes of explanation, data 108 associated with each dimension 216 is shown in Table 1. Therefore, the data 108 in this example represents projected sales figures for 1999 in San Francisco related to soda products associated with a "Free First Use" campaign. Element 108 is described with reference to FIG. 1 and elements 214, 216, and 218 are described with reference to FIG. 2.

TABLE 1

Example of Dimensions and Data

| Dimension | Data |
|---|---|
| Market | San Francisco |
| Year | 1999 |
| Product | sodas |
| Campaigns | "Free First Use" |
| Scenario | projected |

Table 2 illustrates an example of data 108 associated with the preferred embodiment of the present invention. The dimension 216, "δ" in this example is "sales." Therefore the variable, "$C_\delta$," represents the calculated contribution 218 from the cells association with the array, "$A_\delta$" for each dimension 216. The variable "NM," represents the elements in the array, "$A_\delta$," that have a value and the variable, "M" represents the elements in the array, "$A_\delta$," that have no value. The variable, "T," is the threshold determined by the user for data density. In this example, the value of the variable "T," is one hundred for the dimensions "Market," "Year," "Product," and "Campaigns." Therefore the user expects all the cells associated with the array, "$A_\delta$," to have a value. The variable, "index," is the calculated value of the exponent associated with the threshold, "T." Therefore by means of example, since the value of "NM" for the dimension "Scenario" 508 is thirty-eight, the associated index is, "1.6" to compensate for the data sparsity associated with the dimension "Scenario" 508. The variable, "$C_\delta$" is the density-corrected contribution 204 for the dimension 216, "δ." The variable, "$S_\delta$" represents the density correction factor 206. The variable, "$C_\delta$" represents the normalized density-corrected contribution 210. Elements 206 and 210 are described with reference to FIG. 2.

TABLE 2

Example of Sales Data

| Dimension | Market | Year | Product | Campaigns | Scenario |
|---|---|---|---|---|---|
| $C_\delta''$ | 8.6 | −9 | 4 | 2.5 | −8.054 |
| NM | 180 | 150 | 270 | 170 | 2 |

TABLE 2-continued

Example of Sales Data

| Dimension | Market | Year | Product | Campaigns | Scenario |
|---|---|---|---|---|---|
| M | 20 | 0 | 30 | 0 | 3 |
| T | 100 | 100 | 100 | 100 | 5 |
| index | 1 | 1 | 1 | 1 | 1.6 |
| $S_\delta$ | 0.9 | 1 | 0.9 | 1 | 0.4 |
| $C_\delta'$ | 7.74 | −9 | 3.6 | 2.5 | −1.859 |
| $\|C_\delta'\|$ | 7.74 | 9 | 3.6 | 2.5 | 1.859 |
| $C_\delta$ | 0.313371 | −0.36438 | 0.145754 | 0.101218 | −0.07527 |
| Contribution $\|C_\delta\|$ | 0.313371 | 0.36438 | 0.145754 | 0.101218 | 0.07527 |

Based on the results shown in Table 2, the dimensions 216 contributing to the exception 214 sorted in order of importance follow: "Year," as shown in element 310, "Market," as shown in element 302, "Product," as shown in element 308, "Campaigns," as shown in element 506, and "Scenario," as shown in element 508." The dimensions sorted in order of importance are shown in Table 3. Therefore, the preferred embodiment of the present invention simplifies the multi-dimensional data 110 that may be presented to a data analyst by eliminating the unimportant dimensions 216. Element 110 is described with reference to FIG. 1.

TABLE 3

Dimensions Sorted in Order of Importance

| Sorted Dimensions | Year | Market | Product | Campaigns | Scenario |
|---|---|---|---|---|---|
| $C_\delta$ | −0.36438 | 0.313371 | 0.145754 | 0.101218 | −0.07527 |
| Contribution $\|C_\delta\|$ | 0.36438 | 0.313371 | 0.145754 | 0.101218 | 0.07527 |

Now, as further shown in FIG. 5A, the sorted dimensions 216 that are contributing to the exception may be presented in a variety of visual interpretations 220. The chart shown in FIG. 5A is exemplary and does not limit the variety of presentation formats that may be used in association with the present invention. By means of example, pie charts may also be used to present the information derived by the operations of the present invention. Therefore, as shown in element 504, the absolute contribution of the dimension 216, "$|C_\delta|$," is shown in sorted order. Now, instead of presenting thirty to forty views to the data analyst as in the past, the dimensions 216 are presented in sorted order. Elements 216 and 220 are described with reference to FIG. 2.

Now the obvious choice for the best view 216 of the exception 214 is, "Year*Market." In the past without the operations of the present invention, a data analyst would have to scan at least ten, two-dimensional views 216 to determine that "Year*Market" is the best view 216. Given five dimensions 216 and for a two-dimensional view, the possible views 216 are: (5*4)/2=10. Therefore the operation of the present invention has improved the efficiency of viewing multidimensional data 110 over operations of the past.

Further, the operation of the present invention has improved the practice of multidimensional data analysis by introducing information about the density of the multidimensional data 110 associated with a particular dimension 216. For example, the dimension "Scenario as shown in element 508 is minimally populated with data 108 in the present example and the user has indicated, via the value of the variable, "T," that density of data 108 is important. The preferred embodiment of the present invention minimizes the importance of the dimension "Scenario," as shown in element 508. Therefore, even though the absolute value of the contribution 218, "$C_d$" from the dimension "Scenario" 508 is higher (8.0) than that from the dimension "Campaigns" 506 (2.5), the contribution from the dimension "Campaigns" 506 is of higher importance.

As shown in FIG. 5B and element 520, this example is a visual interpretation 220 and illustrates the dimension-wise contribution 218 with directional information. This is also an example of the use of the linguistic information framework 211. The information associated with negative or positive directional values can be used to assign linguistic labels 212 to the exception 214. Therefore, if the density-corrected contribution 204 is greater than zero, $\{(x'-\mu_\delta)/\sigma_\delta\}>0$, then we can assign statements like: "The value is more than most contributions in dimension δ." That is, the value is more than most contributions 216 if the density-corrected contribution 204 is greater than the mean, $\sigma_\delta$. Elements 211 and 212 are described with reference to FIG. 2.

Further, if we are able to qualify the density-corrected contribution 204 as being very important, then we can make statements like: "The value is much more than most contributions in dimension δ." Qualifying the density-corrected contribution 204 as being very important may be accomplished by determining on a relative scale whether the value of $\{(x'-\mu_\delta)/\sigma_\delta\}$ is sufficiently large.

A linguistic interpretation 212 for the example described in FIG. 5A and refined in FIG. 5B follows. "The Sales value is much lower at 1999 than many other years and more at San Francisco than many other markets and is more than many other products and campaign types and lower than other scenarios."

FIG. 6 is a block diagram of a computer system 600, suitable for employment of the present invention. System 600 may be implemented on a general-purpose microcomputer, such as one of the members of the IBM Personal Computer family, or other conventional workstation or graphics computer devices, or mainframe computers. In its preferred embodiment, system 600 includes a user interface 617, a user input device 607, a display 615, a printer 620, a processor 655, a read only memory (ROM) 650, a data storage device 122, such as a hard drive, a random access memory (RAM) 640, and a storage media interface 635, all of which are coupled to a bus 625 or other communication means for communicating information. Although system 600 is represented herein as a standalone system, it is not limited to such, but instead can be part of a networked system. For example, the computer system 600 may be connected locally or remotely to fixed or removable data storage devices 122 and data transmission devices 645. Further, the computer system 100, the server computer system 102, and the client computer system 104 also could be connected to other computer systems via the data transmission devices 645. Elements 100, 102, and 104 are described with reference to FIG. 1.

The RAM 640, the data storage device 122 and the ROM 650, are memory components 658 that store data 108 and instructions for controlling the operation of processor 655, which may be configured as a single processor or as a plurality of processors. The processor 655 executes a program 642 to perform the methods of the present invention, as described herein.

While the program 642 is indicated as loaded into the RAM 640, it may be configured on a storage media 630 for subsequent loading into the data storage device 122, the ROM 650, or the RAM 640 via an appropriate storage media interface 635. Storage media 630 can be any conventional storage media such as a magnetic tape, an optical storage media, a compact disk, or a floppy disk. Alternatively, storage media 630 can be a random access memory 640, or other type of electronic storage, located on a remote storage system.

Generally, the computer programs and operating systems are all tangibly embodied in a computer-readable device or media, such as the memory 658, the data storage device 122, or the data transmission device 645, thereby making an article of manufacture, such as a computer program product, according to the invention. As such, the terms "computer program product" as used herein are intended to encompass a computer program 642 accessible from any computer readable device or media.

Moreover, the computer programs 642 and operating systems are comprised of instructions which, when read and executed by the computer system 100, the server computer system 102, and the client computer system 104, cause the computer system 100, the server computer system 102, and the client computer system 104 to perform the steps necessary to implement and use the present invention. Under control of the operating system, the computer programs 642 may be loaded from the memory 658, the data storage device 122, or the data transmission devices 645 into the memories 658 of the computer system 100, the server computer system 102, and the client computer system 104 for use during actual operations. Those skilled in the art will recognize many modifications may be made to this configuration without departing from the scope of the present invention.

The user interface 617 is an input device, such as a keyboard or speech recognition subsystem, for enabling a user to communicate information and command selections to the processor 655. The user can observe information generated by the system 600 via the display 615 or the printer 620. The user input device 607 is a device such as a mouse, track-ball, or joy-stick, which allows the user to manipulate a cursor on the display 615 for communicating additional information and command selections to the processor 655.

When operating in accordance with one embodiment of the present invention, the system 600 interprets, explains, and manipulates exceptions in multidimensional data 110. The processor 655 and the program 642 collectively operate as a module for interpretation, explanation, and manipulation of exceptions in multidimensional data 110. It will be appreciated that the present invention offers many advantages over prior art techniques. Element 110 is described with reference to FIG. 1.

The present invention is typically implemented using one or more computer programs 642, each of which executes under the control of an operating system and causes the computer system 100, the server computer system 102, and the client computer system 104 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims.

Trademarks

IBM is a trademark or registered trademark of International Business machines, Corporation in the United States and other countries.

What is claimed is:

1. A computer-implemented method for interpreting, explaining, and manipulating selected exceptions in multi-dimensional data, at least one dimension being associated with each said selected exception, comprising:
   qualifying a plurality of individual contributions for each said dimension;
   assigning a density threshold preset rule to said each dimension;
   determining a density correction factor of each said contribution;
   determining a density-corrected contribution of said each contribution based on said density correction factor and said density threshold preset rule;
   normalizing said density-corrected contributions; and
   sorting said each dimension according to said normalized, density-corrected contributions associated with said each dimension.

2. The computer-implemented method of claim 1, further comprising selecting a best view of said sorted each dimension associated with said selected exception.

3. The computer-implemented method of claim 2, further comprising selecting a two-dimensional said best view.

4. The computer-implemented method of claim 2, further comprising selecting a three-dimensional said best view.

5. The computer-implemented method of claim 1, further comprising accepting user input for said density threshold preset rule.

6. The computer-implemented method of claim 2, further comprising representing said best view visually.

7. The computer-implemented method of claim 1, further comprising creating a linguistic information framework for linguistically interpreting said sorted dimension.

8. The computer-implemented method of claim 7, further comprising representing said sorted dimension by a linguistic interpretation via said linguistic information framework.

9. A computer system for interpreting, explaining, and manipulating selected exceptions in multidimensional data, at least one dimension being associated with each said selected exception, comprising:
   a plurality of individual contributions that are qualified for each said dimension;
   a density threshold preset rule that is assigned to said each dimension;

a density correction factor that is determined for each said contribution;

a density-corrected contribution of said each contribution that is determined based on said density correction factor and said density threshold preset rule;

said density-corrected contributions that are normalized; and said each dimension that is normalized according to said normalized, density-corrected contributions associated with said each dimension.

10. The computer system of claim 9 further comprising a best view of said sorted each dimension associated with said selected exception.

11. The computer system of claim 10, further comprising said best view that is two-dimensional.

12. The computer system of claim 10, further comprising said best view that is three-dimensional.

13. The computer system of claim 9, further comprising said density threshold preset rule that is defined by user input.

14. The computer system of claim 10, further comprising said best view that is represented visually.

15. The computer system of claim 9, further comprising a linguistic information framework for linguistically interpreting said sorted dimension.

16. The computer system of claim 15 further comprising said sorted dimension that is represented by a linguistic interpretation via said linguistic information framework.

17. An article of manufacture comprising a program storage medium readable by a computer and embodying one or more instructions executable by said computer for interpreting, explaining, and manipulating selected exceptions in multidimensional data, at least one dimension being associated with each said selected exception, wherein:

computer-readable program code qualifies a plurality of individual contributions for each said dimension;

computer-readable program code assigns a density threshold preset rule to said each dimension;

computer-readable program code determines a density correction factor of each said contribution;

computer-readable program code determines a density-corrected contribution of said each contribution based on said density correction factor and said density threshold preset rule;

computer-readable program code normalizes said density-corrected contributions; and computer-readable program code sorts said each dimension according to said normalized, density-corrected contributions associated with said each dimension.

18. The article of manufacture of claim 17, wherein computer-readable program code selects a best view of said sorted each dimension associated with said selected exception.

19. The article of manufacture of claim 17, wherein computer-readable program code accepts user input for said density threshold preset rule.

20. The article of manufacture of claim 18, wherein computer-readable program code represents said best view visually.

21. The article of manufacture of claim 17, wherein computer-readable program code creates a linguistic information framework for linguistically interpreting said sorted dimension.

22. The article of manufacture of claim 21, wherein computer-readable program code represents said sorted dimension by a linguistic interpretation via said linguistic information framework.

* * * * *